3,567,520
PROCESS FOR MANUFACTURING ELECTRODES OF FUEL CELLS

Francis Dennery and Gerard Mondain-Monval, Paris, France, assignors to L'Air Liquide, Societe Anonyme pour l'Etude et Exploitation des Procedes Georges Claude, Paris, France
No Drawing. Filed Sept. 28, 1967, Ser. No. 671,188
Claims priority, application France, Oct. 13, 1966, 79,869
Int. Cl. C23f 17/00; F26b 5/06; H01m 13/04
U.S. Cl. 136—120                                    7 Claims

ABSTRACT OF THE DISCLOSURE

Process for manufacturing electrodes for fuel cells, wherein a paste, comprising a mechanically resistant material in the dry state, a solvent for this material and possibly an oxidation or reduction catalyst or a component capable of generating such a catalyst, is subjected to a freeze-drying in which at least one of the operations of freezing and sublimation is effected at a sufficiently variable speed, for there to be formed a material having pores of variable size over its thickness, and variable concentrations of the catalyst or of the component capable of generating it.

---

The invention relates to the formation of porous layers which have to a high degree certain properties which are desirable with regard to particular applications, especially for forming the electrodes of fuel cells.

It is known that fuel cells, and more particularly gas cells, are based on the same principle as the conventional electrochemical cells.

The gas cell effects the oxidation of a fuel with a combustion-supporting agent, with transfer of electrons from the fuel towards the combustion-supporting agent by a circuit externally of the cell.

The yield of fuel cells depends largely on the choice of the electrodes. These latter are usually obtained by powder metallurgy, in the form of layers of powders sintered or agglomerated on a support.

The properties which are involved in the choice of an electrode are the electrical conductivity, the permeability, the porosity and the catalytic activity.

First of all, it is necessary for the electrode to be a good conductor throughout, so that the electrons liberated by the oxidation reaction of the fuel are collected with a minimum of energy loss.

The permeability of the material should facilitate the diffusion of the reactive molecules and the electrolyte and is partly dependent on the porosity of the material.

The porosity serves a double purpose: the maintaining of the reaction zone within the electrode and the support of the catalytic activity, which is favoured by the increase in the active surface of the electrodes.

The reaction zone is extended over a depth of about 50 to 60 microns upstream of the meniscus forming the surface of contact between the fuel and the electrolyte. Attempts have been made to stabilise this zone by the formation of two-layer electrodes; a layer having large pores (100 to 250 microns) which is penetrated by the gas and a "barrier layer" with fine pores which is penetrated by the electrolyte.

Despite this precaution, certain pores communicate from one layer to the other and this can give rise to a partial "choking" or "bubbling" of the electrode. Finally, the catalytic activity plays an important part in connection with the performnce of the cells.

The present invention has particularly for its object to permit the formation of porous layers endowed with a structure by which the desired qualities are imparted to it to a very high degree, so as to obtain high performances in the fuel cells: good electrical conductivity, high catalytic activity, good diffusion properties and an efficient stabilisation of the reaction zone.

Lyophilisation consists in dissolving a material in a solvent, in freezing the solution which is obtained and then in eliminating the solvent by sublimation, generally in vacuo and at low temperature. The frozen solution can in particular be exposed to an infra-red radiation in a more or less strong vacuum so as to accelerate the sublimation process.

Lyophilisation makes it possible to obtain highly porous products, because a void is formed in the place of each crystal of the solvent eliminated by sublimation.

Earlier work carried out by Professor Louis Rey (Book: Aspects Théoriques et Industriels de la Lyophilisation—published by Hermann, Paris 1964, pages 627–628) showed the possibility of supports of catalysts endowed with a very large specific area being formed by lyophilisation: several tens of square metres per gram of material.

According to the invention, a porous layer of prescribed structure which is progressively variable over its thickness has been formed by a lyophilisation (or freeze-drying) process by subjecting a paste comprising at least one mechanically resistant material in the dry state and a solvent for this material to a freeze-drying, in which at least one of the operations of freezing and sublimation is effected at a speed sufficiently variable for a material to be formed which has pores of variable size over its thickness.

The invention enables an advantage to be derived from this property, this advantage being all the greater because it permits the porosity to be distributed over the thickness of the membrane in a progressive manner suitable for eliminating the phenomena of "bubbling" and "choking" which have been referred to above.

For this purpose, care is to be taken according to the invention to regulate the processes of freezing and sublimation as a function of a certain number of well-established parameters: time, temperature, pressure, nature of the solvent or solvents, of the solute and possible additions, concentration and initial viscosity. In particular, it will be possible, by an initial relatively fast cooling, to cause the formation of a surface layer constituted by very fine crystals, so that after sublimation, this layer has a very fine porosity. The cooling could then be progressively slowed so as to form crystals of increasing size in proportion as the freezing progresses from the initial fine-grain layer.

It is also possible to control the structure of the porous layer by a predetermined programming of the main parameters: time, temperature and pressure of the sublimation process. It is also possible to take advantage of the fact that the crystals are orientated at the time of freezing in accordance with the thermal gradient, which to a certain degree enables the vacuoles which will appear after lyophilisation to be oriented at will.

It is also appropriate to emphasise that the programming of the freezing process and then the sublimation process in accordance with the present invention makes it possible simultaneously to obtain firstly a prescribed porosity and secondly a prescribed distribution of the conductor and catalyst metals incorporated into the electrode.

In particular, the distribution of these metals can be regulated by acting firstly on the viscosity of the suspension and secondly on the sedimentation time until there is complete freezing.

As non-limiting examples, different ways of carrying out the invention are described:

A paste is formed which consists of a solvent, such as benzene, a solute for example polystyrene, and conductive particles (carbon or silver) and catalytic particles (nickel, silver or platinum) in suspension.

A solution of polystyrene (20% by weight) in benzene, intimately mixed with 20 to 30% of powdered silver (grain size smaller than about 30 microns) and 20% by weight of powdered nickel of 8 microns, is quickly frozen in a layer of 5 mm. thickness by contact for 10 minutes with a cold plate at −60° C. Then the frozen material is lyophilised by heating under vacuum for 12 hours. There is obtained a sheet of a pore size from 30 microns (on the side which was in contact with the cold plate) to 300 microns (on the other side), of a mean specific surface of 75 m.$^2$ per gram, which has a rigid, water-repellent structure and which is a good electrical conductor, with a resistivity close to that of carbon, namely about 0.01 ohm/cm. The permeability of this material is sufficient to allow the flow of air under a pressure drop of 100 mm. Hg for a material with a thickness of 10 mm.

It is to be noted that a freezing carried out too quickly can cause shrinkages and fissures in the lyophilised material.

By causing concentration of the polystyrene in the initial solution to vary from 10 to 20%, it is possible to modify the viscosity of this solution so as to regulate the progressive sedimentation of the metallic particles and to obtain at will a prescribed distribution of the latter. By way of example, it is also possible to prepare a porous layer according to the invention by lyophilising a colloidal suspension of Teflon (polytetrafluoroethylene) in aqueous medium to which possibly is added a colloidal suspension of nickel and silver.

According to a second method of carrying out the invention, first of all a non-conducting and non-catalytic lyophilised matrix is formed, and then this matrix is made conducting and catalytic by a deposit of metal on the surface of the pores.

This deposition can be achieved by chemical reduction, by metallisation in vacuo or even by electrolysis, after a first metallisation.

By way of example, the lyophilised matrix can be impregnated with a solution of silver nitrate and then the nitrate can be reduced by a reducing agent such as formaldehyde in order to obtain a silver deposit at the surface of the pores.

It is also possible, for example, to deposit iron, nickel or cobalt by thermal or chemical decomposition of the carbonyls of these metals.

The metallisation in vacuo enables the thickness of the deposit to be accurately regulated, for example, to a value smaller than 1 micron. The deposit obtained is porous; its adherence is lower than that of the deposits obtained by chemical or electrolytic procedures. In view of the fact that the vapour tensions of the various elements are different for a given temperature, there is partial distillation of the alloy, and this makes it possible for a selective deposit to be obtained by metallisation.

Electrolysis enables a metal to be deposited on another less reducing metal, for example a deposit of nickel on copper or silver. It is to be noted that the metallisation in vacuo enables two metals (one of which could be a catalysis promoter) to be deposited in a single operation, starting from an alloy.

A third way of carrying out the invention consists in incorporating a conductive screen into the paste adapted to be lyophilised, which screen will serve both as a current collector and as a mechanical support for the porous layer.

This reticulated support could more particularly be formed by a grid of stainless steel, porous carbon or sintered metal. It will be given beforehand the final shape of the electrode.

The conductive screen could be impregnated with a more or less fluid paste composed of a substance suitable for forming the substrate necessary for the lyophilisation, of a solvent or suspension agent, and of a catalyst or precursor agent capable of producing a catalyst. The lyophilised material will be formed directly on its metallic support, which will constitute the current collector. This method of moulding enables electrodes of non-homogeneous and controlled structure to be produced, both as regards its porosity and permeability and as regards its content of conductor and catalyst metals.

By way of example, a suspension of colloidal silica is prepared by changing the pH of an aqueous solution of ethyl silicate, followed by dissolving nickel carbonate in this suspension and homogenising it.

After complete drying, the residue is heated under neutral gas atmosphere so as to decompose the nickel carbonate, then the nickel oxide thus obtained is reduced by subjecting it to a current of hydrogen at 250–300° C. in order to liberate the metal.

In order to provide an electrode with platinum, a fine suspension of aluminum hydroxide is prepared from a solution of aluminum nitrate, then chloroplatinic acid is dissolved therein. A porous support is impregnated with this preparation before proceeding with freeze-drying. The electrode is then treated with a hydrogen current in the region of 300–400° C. for liberating the metallic platinum.

It is also possible directly to impregnate a porous support of carbon or sintered metal with a solution of "catalyst precursor," such as nickel carbonate or chloroplatinic acid, and directly to lyophilise this solution without adding thereto a substrate former such as colloidal aluminum oxide or silica. In this case, a powder is formed of which the microscopic grains are firmly immobilised after lyophilisation in the pores of the support.

Conversely, it is also possible to prepare a refractory substrate by lyophilising a suspension of colloidal aluminum oxide or silica, then metallising this substrate by one of the metallisation processes which are described above. The use of a refractory substrate makes it possible to use in certain cases metallisation methods at high temperature; in addition, it enables electrodes to be obtained which can be used at high temperatures, contrary to the electrodes formed with an organic substrate such as polystyrene.

It is also possible to act on the structure of the lyophilised material by using if necessary a mixture of solvents, of which the respective concentrations will be chosen by taking into account the other parameters referred to above and which control the programmed lyophilisation operation.

The materials and the electrodes formed according to the process of the invention and in accordance with the different forms of the process as described above are applicable to all the types of fuel cells: gas cells, liquid or dissolved fuel cells, hydrocarbon cells, "redox" cells, etc. They are also applicable to very different electrolysis operations, any time that the properties of permeability, controlled porosity and catalytic activity are desirable.

The process for the manufacture of porous electrodes by lyophilisation can also be applied to the formation of membranes permitting the immobilisation of a liquid electrolyte or of forming by themselves a solid electrolyte in accordance with the technique of cells known as of the "membrane" type.

As regards the use of the electrodes prepared according to the invention, these latter may or may not comprise a reticulated internal fitting which serves simultaneously as a mechanical support and a current collector.

The electrode can also be formed of only the lyophilised material. This material can be machined, and cut to size, always taking into account its possible anisotropy. However, the use of moulds of appropriate shape in which the lyophilisation of the initial mixture will be carried out makes it possible directly to obtain electrodes of fairly accurate shape which can then if necessary be corrected by machining or transferred and sealed on a support consisting of metal or carbon by means of a conducting lacquer or adhesive which is for example based on silver.

Whatever may be the method of use chosen, the process according to the invention permits forming a material with prescribed porosity having a very large internal surface which may reach several tens of square meters per gram of material. In addition, this internal surface is endowed with a high catalytic activity, because it is established in vacuo in solid phase, undergoing a powerful desorption.

Occasionally, the material obtained by lyophilisation has a closed porosity. However, in this case, the fine partitioning membrane, the thickness of which is only a few tenths of a micron, are very permeable.

On account of the very divided structure of the material free radicals with high catalytic activity, obtained for example by irradiation with X-rays or gamma rays, to be fixed on certain sites, the particular structure of the lyophilised material having the effect of limiting to a very high degree the recombination of the free radicals, this enabling the activity thereof to be preserved.

What we claim is:

1. A process for manufacturing electrodes for fuel cells, comprising forming a paste of a material which is mechanically resistant in the dry state and a non-metallic liquid carrier for that material, freezing the liquid of the paste, drying the paste in the frozen state by sublimation to remove therefrom the frozen liquid thereby to produce a porous lyophilized product, and conducting at least one of said freezing and drying steps at different speeds in different portions of the paste thereby to produce an electrode having pores of different size in different portions of the electrode.

2. A process as claimed in claim 1, and admixing an electricity-conducting material with the paste prior to freezing and drying.

3. A process as claimed in claim 1, and admixing with the paste a catalyst for the chemical reaction to be performed with the electrode.

4. A process as claimed in claim 1, and impregnating the resultant porous electrode with a solution of at least one reducible salt of a metal, vaporizing the solvent from said solution thereby to leave metallic salt in the porous electrode, and reducing said at least one salt.

5. A process as claimed in claim 1, and depositing a metal by electrolysis on said porous electrode.

6. A process as claimed in claim 1, and supporting said paste to be frozen and dried on a reticulated rigid support which is a good conductor of electricity.

7. A process for manufacturing electrodes for fuel cells, comprising forming a paste of a material which is mechanically resistant in the dry state, metallic particles and a non-metallic liquid carrier for said material and metallic particles, freezing the liquid of the paste, drying the paste in the frozen state by sublimation to produce a porous lyophilized product, and providing such respective amounts of said paste and said liquid carrier and conducting said freezing operation at such a speed as to produce an electrode having different concentrations of said metallic particles in different portions of the electrode.

References Cited

UNITED STATES PATENTS

| | | | |
|---|---|---|---|
| 3,288,653 | 11/1966 | Holt et al. | 136—120FC |
| 3,351,439 | 11/1967 | Jost | 136—120XFC |
| 3,367,023 | 2/1968 | Petermann | 75—222X |
| 3,422,515 | 1/1969 | Klein | 75—222X |
| 3,438,815 | 4/1969 | Giner | 136—86 |
| 3,357,819 | 12/1967 | Landsberg | 75—.5 |

FOREIGN PATENTS

| | | | |
|---|---|---|---|
| 986,324 | 3/1965 | Great Britain | 136—120 |

WINSTON A. DOUGLAS, Primary Examiner

M. J. ANDREWS, Assistant Examiner

U.S. Cl. X.R.

34—5; 117—61; 204—38